March 27, 1962 W. P. LUXEDER 3,027,017
CARGO SPACE DIVIDER FOR AUTOMOBILES
Filed March 16, 1960

INVENTOR.
WILLIAM P. LUXEDER
BY
ATTORNEY

United States Patent Office 3,027,017
Patented Mar. 27, 1962

3,027,017
CARGO SPACE DIVIDER FOR AUTOMOBILES
William P. Luxeder, 151 W. Nimisila Road, Akron, Ohio
Filed Mar. 16, 1960, Ser. No. 15,398
6 Claims. (Cl. 211—184)

This invention relates to the art of cargo space dividing apparatus and in particular has reference to improvements in dividing means for use in the cargo space of an automobile.

In recent years there has been a marked increase in the number of "station wagon" type of automobiles in use throughout the country. In automobiles of this type there is provided a rear deck area that is accessible from a door provided at the rear of the automobile and in this fashion a relatively large, flat space is provided interiorly of the passenger section and rearwardly of the second seat, with such space permitting storage of a considerable amount of luggage or other items thereon. In many instances mats are provided for covering this cargo area so that the same may be used for the sleeping of small children.

Additionally, station wagons are of such construction that the area of cargo space provided interiorly of the automobile can, in most instances, be approximately doubled by merely folding the seats so that the back surfaces thereof form a continuous extension of the cargo area. In this fashion sufficient room is normally obtained to permit the sleeping of an adult in the increased cargo area.

While the above features have accounted for much of the popularity of station wagons in recent years, it should be noted that the use of the same is subject to certain limitations.

First, and because the cargo space, in any instance, is relatively large, it is normally not feasible to stand grocery packages or similarly shaped items upright due to the fact that the same will fall over to become either broken or displaced. In the event of such tipping or falling, recovery of the packages involved becomes increasingly difficult due to the fact that the same will normally shift forwardly of the space so as to become less accessible from the rear door of the station wagon.

In many instances it is also preferable to longitudinally divide the cargo area so that one half of the same may be used for the storing of packages, for example, while the other half may be used for the sleeping of a small infant. At the present time, the absence of known dividing means in the prior art has precluded such division, with the result that packages oftentimes fall upon the sleeping infant or otherwise become displaced from their original position.

It has been discovered that the aforementioned limitations can be obviated by providing a removable type of cargo dividing unit that is preferably detachably secured to the normal cargo receiving area and which also is preferably capable of being positioned either transversely or longitudinally of the same.

While the principles of invention hereinafter to be disclosed can be utilized as components of original equipment, it has been found that existing station wagons can be provided with a shock absorbent mat that is receivable in the cargo area and that the mat can further be provided with socket or pin elements that will coact with a fence member so as to permit selective positioning of a dividing fence with respect to the positioned mat. In this fashion the advantages of a sleeping pad or mattress can be achieved, while still retaining the inherent advantage of having cargo dividing means provided at the same time.

Production of an improved cargo dividing unit having the above described advantages accordingly becomes the principal object of this invention, with other objects becoming more apparent upon a reading of the following brief specification, considered and interpreted in the light of the accompanying drawings.

Figure 1:
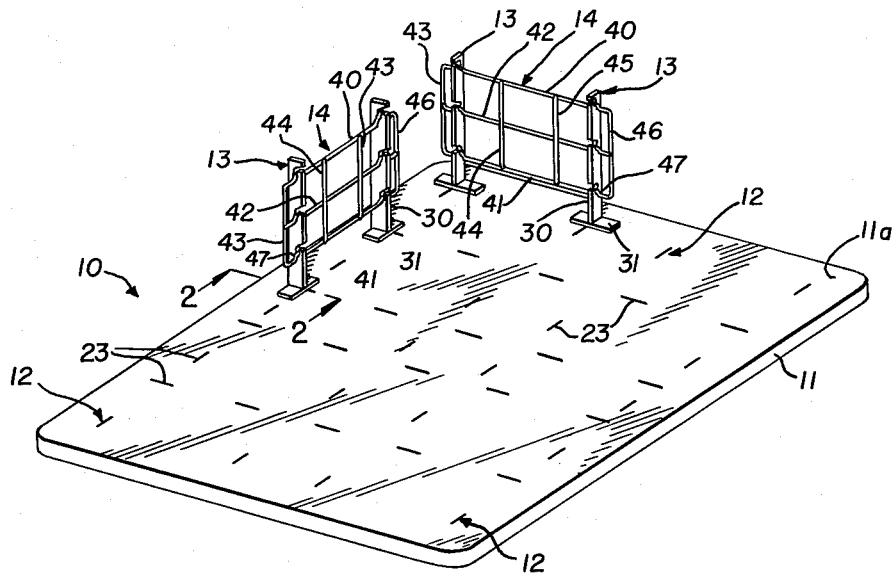
FIGURE 1 is a perspective view of the improved cargo dividing unit illustrated in connection with a mat receivable on the flat cargo space of a station wagon, for example.

Referring now to the drawings and in particular to FIGURE 1 thereof, the improved cargo dividing unit, generally designated by the numeral 10, is shown including a mat 11, having a plurality of pocket openings 12, 12 disposed in the cargo receiving surface 11a thereof, so as to permit selective attachment of a plurality of upright support standards 13, 13; the arrangement being such that the support standards 13, 13 will normally be arranged at a predetermined space from each other so as to releasably support a fence section 14 therebetween as clearly shown in FIGURE 1.

Figure 3:
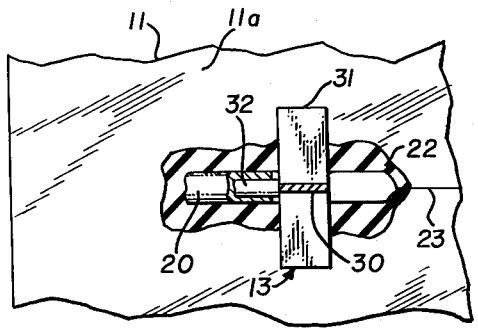
FIGURE 3 is a plan view taken on the lines 3—3 of FIGURE 2.
Figures 2, 5:
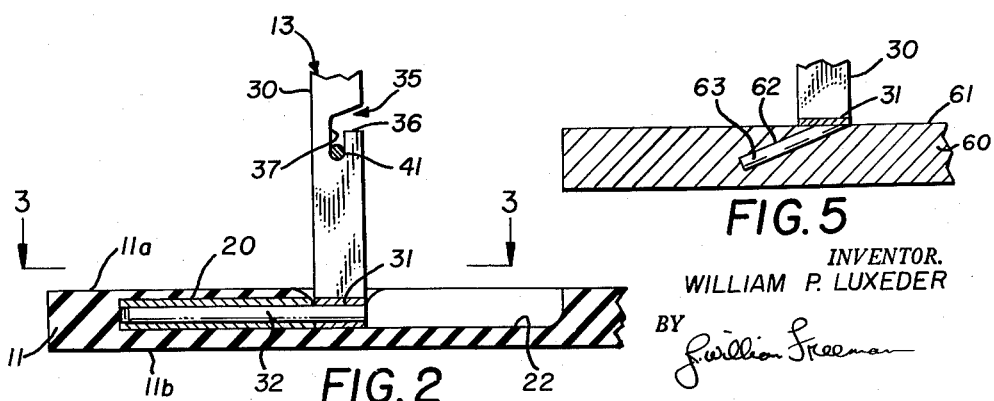
FIGURE 2 is a vertical section taken on the lines 2—2 of FIGURE 1.

Referring now to FIGURES 2 and 3 for a detailed consideration of the structure of the mat 11, it will be seen that each pocket opening 12 includes a tubular socket 20 that is embedded between the faces 11a and 11b of mat 11 so as to normally not interfere with the use of the mat in times when the divider fence means are not secured thereto.

Additionally, a cavity 22 is provided in each pocket section for the purpose of permitting insertion of the projecting pin portion into the socket 20, with the cavity 22 being accessible by virtue of a slit 23 provided on the surface 11a. In this regard, and with the sockets 20 embedded as just described, the only indication of any pocket 12 will be the slits 23, 23 that appear on the surface 11a and, accordingly, while a number of such slits 23, 23 are shown in FIGURE 1, it is to be understood that each slit represents a complete pocket unit 12 as just described. Additionally, certain of the pockets 12, 12 are normally disposed at right angles to each other so as to permit disposing of the fence sections at right angles to each other as shown in FIGURE 1. In this fashion and by providing a plurality of pockets, various dividing arrangements can be made.

In the drawings, the socket 20 has been shown opening into one cavity 22 provided adjacent one axial end of the socket 20. It is to be understood, however, that a second cavity 22 could be accessible to the flange comprising a pin 32 from either end, with the second cavity preferably being constructed in the manner just described.

Considering next the structure of the standards 13, 13, it will be first noted that the same are all of identical configuration in the preferred form of the invention illustrated in FIGURES 1 to 3 and, accordingly, include an upright member 30 having a base 31 at the lowermost portion thereof that extends at right angles thereto so as to define a unit of approximately T-shaped configuration. Projecting from the point of juncture between the standard 30 and base 31 is a pin 32 that is of appropriate size to be telescoped interiorly of the previously described socket 20, with this position of component parts being shown best in FIGURE 2 of the drawings.

For the purpose of accommodating the fence 14, each upright portion 30 is further provided with a plurality of notched openings 35, 35 that each include a flared mouth opening 36 and a vertically disposed slot 37.

The fence section 14 is similarly shown as being of generally quadrilateral configuration so as to include parallel top, bottom and middle rail sections 40, 41 and 42, as well as parallel vertical rails 43, 44, 45 and 46.

Each of the rails 40, 41 and 42 is preferably joggled, as at 47, so as to prevent shifting thereof transversely of the standards 13 during the period that the fence is secured to the standards, as shown in FIGURE 1.

While the dividing unit herein described has been illustrated as including separate upright standards and a connecting dividing fence, it is to be understood that these component parts could, if desired, be joined together in a single unit instead of in three separate units as described. Similarly, the fence section 14 could, if required, be replaced by a box type of structure of any desired configuration, with the box either being connected to the standards on a permanent basis or being releasably connected thereto as illustrated in connection with FIGURES 1 to 3 of the drawings.

In use or operation of the improved cargo dividing unit, the mat will first be positioned so that the surface 11b is disposed on the cargo receiving surface of the automobile involved and, at this time, the surface 11a will define the cargo receiving surface of the automobile. With the mat positioned as just described, it is merely necessary that the user take one of the standards and position the same in any of the desired pockets 12, 12 by first passing the pin 32 thereof through the slit 23 so as to permit the pin 32 to be concentrically aligned with the concealed socket 20.

At this time, a slight movement to the left (FIGURE 2) will permit the pin 32 to be telescoped within the socket 20, at which time the standard 13 is positioned for use. At this time, it will be noted that the base section 31 will be in abutment with the bottom wall of the cavity 22 so that rotation of the standard about the axis of pin 32 is accordingly obviated.

At this time the same procedure may be repeated with respect to a second standard 13 and when two such standards 13 have been positioned as shown in FIGURE 1, it is merely necessary that the dividing fence be dropped into place in the aligned notches 35, 35 of positioned standards, with care being taken to position the joggle of the rail sections thereof in the notches as shown in FIGURE 1.

If desired, a second cargo dividing unit may be positioned by following the above described method and it follows that removal of the unit merely involves the removal of the fence followed by removal of the standard sections.

It will be seen from the foregoing that there has been provided a new and improved type of cargo dividing unit that enhances the use of the cargo space of a station wagon by providing readily detachable and selectively positionable units that may be easily and quickly inserted into position with a minimal amount of effort so as to create cargo areas of varying dimensions.

Figure 4:
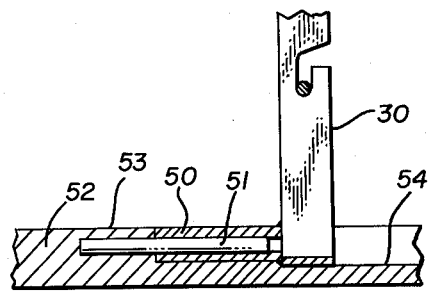
FIGURES 4 and 5 are sectional views similar to FIGURE 2 but showing modified forms of the invention.

In the modified form of the invention shown in FIGURE 4, the pin and socket connection previously described in connection with FIGURES 1 to 3 has been reversed so that a socket 50 projects from the standard 30 much in the manner of the previously described pin 32, with the socket 50 being designed to be telescoped around a pin 51. Also in this form of the invention, the device is shown in connection with a standard deck surface of a station wagon instead of with a mat as previously described. Thus, the deck portion 52 has a cargo receiving surface 53 as well as the pocket 54 within which the pin 51 projects as clearly shown in FIGURE 4. Thus, in this form of the invention, no auxiliary mat is required.

In the modified form of the invention shown in FIGURE 5 a deck member 60 is again provided with a cargo receiving surface 61, with the cargo receiving surface 61 having an angularly inclined slot 62 within which a projecting pin or strap member 63 can be received as shown in the drawings. As before, the standard 30 has a base 31 that engages the cargo receiving surface 61 so as to prevent tipping or turning of the upright standard 30. It is believed obvious that in this form of the invention the necessity for providing large recesses is, accordingly, obviated.

While a full and complete description of the invention has been set forth in accordance with the dictates of the patent statutes, it is to be understood that the invention is not intended to be limited to the specific forms illustrated herein.

It is to be noted in this regard that the preferred form of the invention has been shown in connection with a full size mat that is of approximate area sufficient to cover the rear cargo deck of a six passenger station wagon. In the instance of a nine passenger station wagon, or a station wagon having a split second seat, it is to be understood, that the mat could be segmented into the proper size to cover the rear surfaces of the seat sections and could further be releasably connected thereto with snap type fasteners. In this fashion, when the seats were folded to their flat condition, the mat portions releasably attached thereto would be positioned in alignment with each other to define a cargo receiving surface.

Similarly, use of the improved dividing means in connection with a slidable type of surface that moved relatively of the regular deck surface is also contemplated and, additionally, it is believed manifest that the device illustrated herein would have utility on other types of vehicles as well as other items where it is desirous to adjust the spacing requirements from time to time.

Similarly, while pin and socket means have been illustrated in connection with all forms of the invention described above, it is to be understood that the invention is not intended to be limited to the specific use of pin and socket means except as set forth in the appended claims. Thus, for example, the cargo mat employed could be provided with a series of parallel straps that, in turn, define parallel tabs which could respectively pass over and under a right angle flange portion of the upright standard. Thus, by weaving the bent flange portion of the standard over and under the tabs, it is believed manifest that the standard would be operatively associated with the mat and would be positioned upright thereon.

Accordingly, modifications other than those above described, may be resorted to without departing from the spirit hereof or the scope of the appended claims.

What is claimed is:

1. A cargo dividing unit of the character described, comprising; a cargo mat of sufficient thickness to have shock absorbent qualities and including substantially parallel opposed faces; a plurality of sockets positioned interiorly of said mat in spaced relationship to one said face thereof and being accessible from the opposed face thereof; at least one divider section; and at least one pin member carried by said divider section and being receivable in at least one said socket, whereby said divider section is positioned upright on said mat; said pin projecting at an acute angle from said divider section, the absorbent properties of said cargo mat being substantially unaffected by said sockets.

2. A cargo dividing unit of the character described, comprising; a mat having a cargo receiving surface; a divider section; pin and socket means releasably supporting said divider section in upright condition on said cargo-receiving surface; said pin and socket means being telescoped and being disposed in substantial parallelism with said cargo-receiving surface; and a base plate carried by said divider section in substantially perpendicular relationship to said divider section and said telescoped pin and socket means; said base plate engaging said cargo mat when said pin and socket means are telescoped whereby relative rotation between said pin and said socket means is obviated.

3. A cargo dividing unit of the character described, comprising; a cargo mat of sufficient thickness to have shock absorbent qualities and including substantially parallel opposed faces; a plurality of sockets positioned interiorly of said mat in spaced relationshp to one said face thereof and being accessible from the opposed face thereof; at least one divider section; and at least one pin member carried by said divider section and being receivable in at least one said socket, whereby said divider section is positioned upright on said mat; said sockets being elongate and being disposed in substantial parallelism with said mat; at least two of said sockets being angularly disposed with respect to each other, whereby the angular position of said divider on said mat may be selectively varied, the absorbent properties of said cargo mat being substantially unaffected by said sockets.

4. A cargo dividing unit of the character described, comprising; a cargo mat of sufficient thickness to have shock absorbent qualities and including substantially parallel opposed faces; a plurality of sockets positioned interiorly of said mat in spaced relationshp to one said face thereof and being accessible from the opposed face thereof; at least one divider section; at least one pin member carried by said divider section and being receivable in at least one said socket, whereby said divider section is positioned upright on said mat; said pin projecting at an acute angle from said divider section; and means for preventing rotation between said pin and said socket when interconnected, the absorbent properties of said cargo mat being substantially unaffected by said sockets.

5. A cargo dividing unit of the character described, comprising; a mat having a cargo receiving surface; a divider section having a retaining flange projecting therefrom at right angles; first means for releasably connecting said retaining flange with said mat, whereby said divider section is positioned in upright condition on said mat while being simultaneously supported against forces applied longitudinally of said mat; and second means carried by said divider section and supporting the same against forces applied transversely of said mat.

6. The device of claim 1 further characterized by the fact that said sockets are arranged in pairs, with at least one said pair of sockets extending substantially longitudinally of said mat, while at least one remaining said pair of sockets extends substantially transversely of said mat, whereby said divider may be selectively positioned on said mat in a plurality of positions.

References Cited in the file of this patent

UNITED STATES PATENTS

| | | |
|---|---|---|
| 2,062,802 | Walker | Dec. 1, 1936 |
| 2,863,567 | Friar | Dec. 9, 1958 |
| 2,933,195 | Radek | Apr. 19, 1960 |